United States Patent
Mansfield et al.

(10) Patent No.: US 8,595,519 B2
(45) Date of Patent: Nov. 26, 2013

(54) BUS INSTRUMENT AND METHOD FOR PREDICTIVELY LIMITED POWER CONSUMPTION IN A TWO-WIRE INSTRUMENTATION BUS

(75) Inventors: William M Mansfield, Boulder, CO (US); Craig B McAnally, Thornton, CO (US); Paul J Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 489 days.

(21) Appl. No.: 13/054,838

(22) PCT Filed: Jul. 31, 2008

(86) PCT No.: PCT/US2008/071790
§ 371 (c)(1),
(2), (4) Date: Jan. 19, 2011

(87) PCT Pub. No.: WO2010/014102
PCT Pub. Date: Feb. 4, 2010

(65) Prior Publication Data
US 2011/0121794 A1      May 26, 2011

(51) Int. Cl.
G06F 1/00      (2006.01)
G06F 1/32      (2006.01)
G05F 1/00      (2006.01)

(52) U.S. Cl.
USPC .......................... 713/300; 713/320; 323/220

(58) Field of Classification Search
USPC ....................................................... 713/300
See application file for complete search history.

(56) References Cited

U.S. PATENT DOCUMENTS

| 5,959,372 | A  |   | 9/1999  | Every |
| 6,140,940 | A  |   | 10/2000 | Klofer et al. |
| 6,141,193 | A  | * | 10/2000 | Mercer ........................... 361/18 |
| 6,512,358 | B2 | * | 1/2003  | Klofer et al. ............... 324/103 P |
| 6,799,476 | B2 |   | 10/2004 | Brockhaus |
| 7,016,741 | B2 |   | 3/2006  | Arntson |
| 7,058,521 | B2 |   | 6/2006  | Kowal et al. |
| 7,162,651 | B2 | * | 1/2007  | Brockhaus .................... 713/300 |
| 7,466,748 | B2 | * | 12/2008 | Rauer et al. .................... 375/224 |
| 2002/0005713 | A1 |   | 1/2002  | Klofer et al. |
| 2006/0129856 | A1 | * | 6/2006  | Main et al. .................... 713/320 |
| 2007/0071082 | A1 |   | 3/2007  | Rauer et al. |

FOREIGN PATENT DOCUMENTS

| CN | 1568490 A | 1/2005 |
| EP | 0883097 A2 | 12/1998 |
| EP | 0895209 A1 | 2/1999 |
| WO | 0207124 A1 | 1/2002 |

* cited by examiner

*Primary Examiner* — Suresh Suryawanshi
(74) *Attorney, Agent, or Firm* — The Ollila Law Group LLC

(57) ABSTRACT

A bus instrument (10) configured to predictively limit power consumption and adapted for use with a two-wire instrumentation bus is provided. The bus instrument (10) includes a sensor (13), a shunt regulator (14), and a controller (20). The controller (20) is configured to generate a predicted available power $P_{predicted}$ that will be available to the bus instrument (10) after a change in the loop current $I_L$, compare the predicted available power $P_{predicted}$ to a present time power $P_{t0}$ comprising a controller power $P_{controller}$ plus a sensor power $P_{sensor}$, and reduce the sensor power $P_{sensor}$ if the total available power $P_{available}$ is less than the controller power $P_{controller}$ plus the sensor power $P_{sensor}$.

10 Claims, 3 Drawing Sheets

BUS INSTRUMENT AND METHOD FOR PREDICTIVELY LIMITED POWER CONSUMPTION IN A TWO-WIRE INSTRUMENTATION BUS

BACKGROUND OF THE INVENTION

1. Field of the Invention

The present invention relates to a bus instrument and method for a two-wire instrumentation bus, and more particularly, to a bus instrument and method for predictively limiting power consumption in a two-wire instrumentation bus.

2. Statement of the Problem

Bus loops are commonly used to connect various instruments, such as in industrial settings, for example. The bus loop can provide electrical power to the bus instruments. The bus loop can enable communications between a bus instrument and an external device(s). For example, a bus loop is commonly used for reporting of bus instrument measurements and further may enable control of the bus instrument.

One bus loop protocol is a two-wire bus protocol, sometimes referred to as a 4-20 milliAmp (mA) bus because of inherent power limitations. This bus protocol may be employed for the simplicity of connecting instruments to the bus using only two wires, where the two wires provide both electrical power and electronic communications. This bus protocol may be used in hazardous or explosive environments, for example, where electrical power is limited for reasons of safety.

Communication of measurement values in common two-wire bus protocols comprises controlling and varying the current draw to a predetermined range, such as between 4 and 20 mA. In this bus protocol, a zero flow condition is denoted by controlling the loop current in the bus loop to be 4 mA. A bus loop current of less than 4 mA is not a valid measurement according to the two-wire bus protocol, and can comprise a power-up phase of the bus instrument or some other manner of signaling. Likewise, a maximum flow amount can result in the bus instrument controlling the bus loop current to be about 20 mA.

A host system is connected to the two-wire bus loop and provides the regulated electrical power and receives the communication signaling from all connected bus instruments. The host system translates the current amount (i.e., the measurement value) and passes the measurement value to an external device, such as a monitoring computer.

The limited electrical current and the limited electrical power can be problematic. The bus instrument must operate accurately and reliably without exceeding the current limitations. Increased power demand in the bus instrument can cause the electrical current requirements of the instrument to exceed an amount prescribed by an applicable protocol. Further, in conditions of minimal flow, a two-wire bus instrument cannot consume more than 4 mA of electrical current. This low current level may be problematic and may not be enough electrical current to operate the bus instrument.

In some embodiments, if the power consumption reaches or exceeds an available power limit, then an error condition may result. The error condition in some embodiments may result in faulty or unreliable operation of the bus instrument. The error condition in some embodiments may result in a reset of a processor or processors in the bus instrument.

Therefore, it is desirable that the power consumption of the bus instrument be kept below the allowable power limit if at all possible.

ASPECTS OF THE INVENTION

In one aspect of the invention, a bus instrument configured to predictively limit power consumption and adapted for use with a two-wire instrumentation bus comprises:
  a sensor;
  a shunt regulator configured for shunting excess electrical current; and
  a controller coupled to the shunt regulator and the sensor, with the controller being configured to generate a predicted available power $P_{predicted}$ that will be available to the bus instrument after a change in the loop current $I_L$, compare the predicted available power $P_{predicted}$ to a present time power $P_{t0}$ comprising a controller power $P_{controller}$ plus a sensor power $P_{sensor}$, and reduce the sensor power $P_{sensor}$ if the predicted available power $P_{predicted}$ is less than the controller power $P_{controller}$ plus the sensor power $P_{sensor}$.

Preferably, the controller is further configured to receive a measurement value from the sensor and generate a predicted loop current $I_{L\_next}$ from the measurement value, wherein the predicted available power $P_{predicted}$ is generated using the predicted loop current $I_{L\_next}$.

Preferably, reducing the sensor power $P_{sensor}$ including reducing a sensor current $I_{sensor}$ provided to the sensor.

Preferably, the controller is further configured to determine a loop resistance $R_L$ and a supply voltage $V_S$.

Preferably, determining the loop resistance $R_L$ and supply voltage $V_S$ comprises the preliminary steps of measuring a first loop voltage $V_{L1}$ at a predetermined first loop current $I_{L1}$, measuring a second loop voltage $V_{L2}$ at a predetermined second loop current $I_{L2}$, and determining the loop resistance $R_L$ from the first and second loop voltages $V_{L1}$ and $V_{L2}$ and the first and second loop currents $I_{L1}$ and $I_{L2}$.

In one aspect of the invention, a method for predictively limiting power consumption in a bus instrument of a two-wire instrumentation bus comprises:
  generating a predicted available power $P_{predicted}$ that will be available to the bus instrument after a change in the loop current $I_L$;
  comparing the predicted available power $P_{predicted}$ to a present time power $P_{t0}$ comprising a controller power $P_{controller}$ plus a sensor power $P_{sensor}$; and
  reducing the sensor power $P_{sensor}$ if the predicted available power $P_{predicted}$ is less than the controller power $P_{controller}$ plus the sensor power $P_{sensor}$.

Preferably, the method further comprises receiving a measurement value from the sensor and generating a predicted loop current $I_{L\_next}$ from the measurement value, wherein the predicted available power $P_{predicted}$ is generated using the predicted loop current $I_{L\_next}$.

Preferably, reducing the sensor power $P_{sensor}$ includes reducing a sensor current $I_{sensor}$ provided to the sensor.

Preferably, the method further comprises the preliminary step of determining a loop resistance $R_L$ and a supply voltage $V_S$.

Preferably, determining the loop resistance $R_L$ comprises the preliminary steps of measuring a first loop voltage $V_{L1}$ at a predetermined first loop current $I_{L1}$, measuring a second loop voltage $V_{L2}$ at a predetermined second loop current $I_{L2}$, and determining the loop resistance $R_L$ from the first and second loop voltages $V_{L1}$ and $V_{L2}$ and the first and second loop currents $I_{L1}$ and $I_{L2}$.

DESCRIPTION OF THE DRAWINGS

The same reference number represents the same element on all drawings. It should be understood that the drawings are not necessarily to scale.

DETAILED DESCRIPTION OF THE INVENTION

Figure 1:
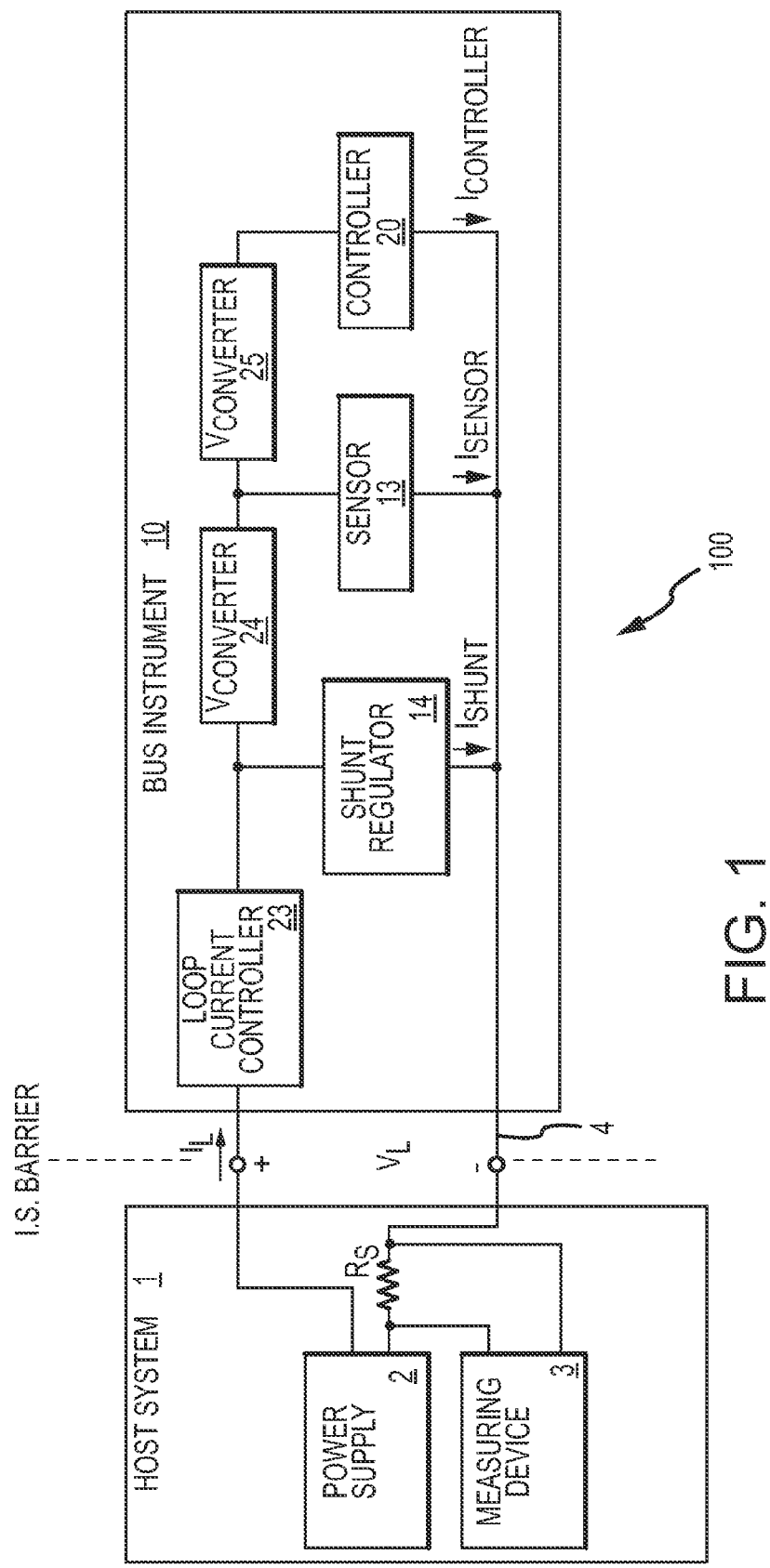
FIG. 1 shows a bus loop system according to an embodiment of the invention.
Figure 2:
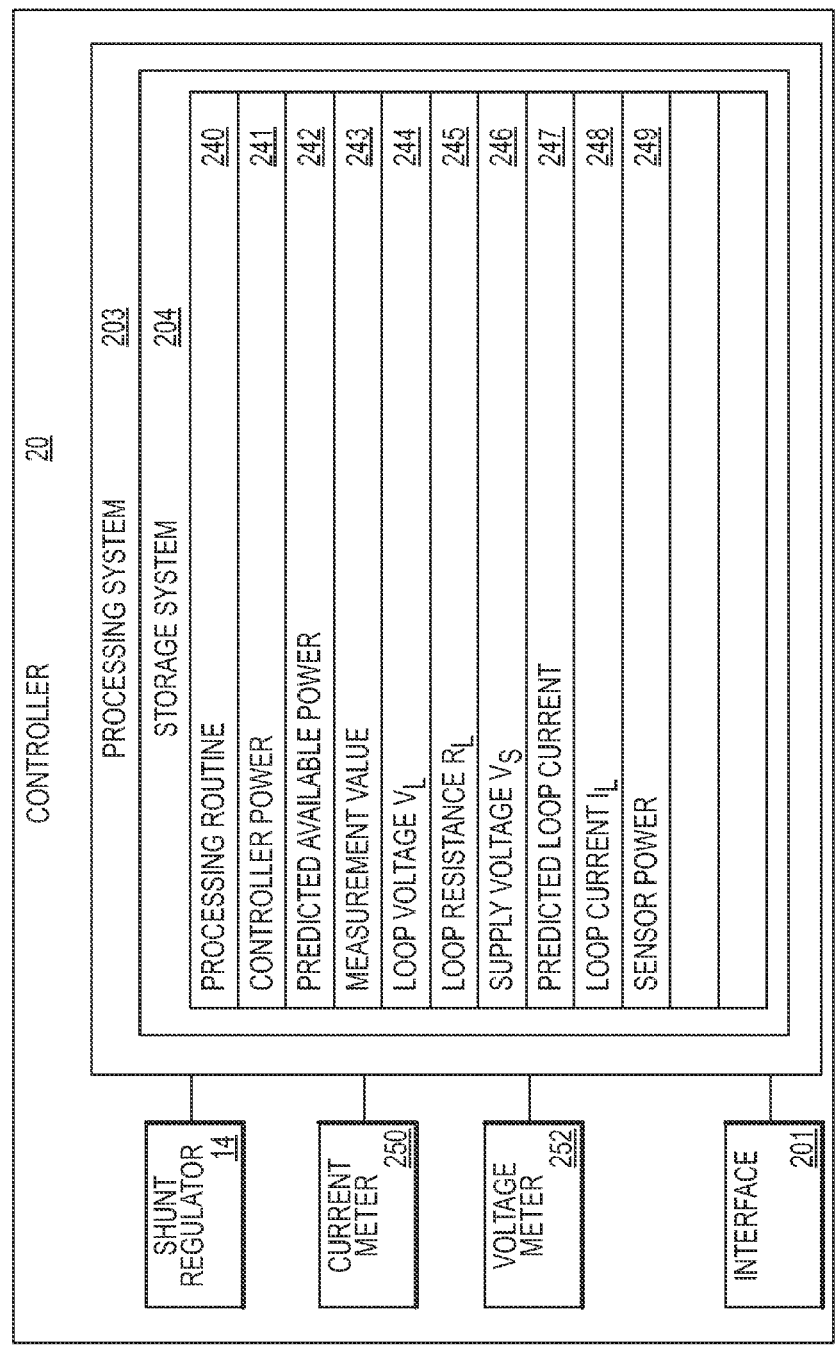
FIG. 2 shows a controller according to an embodiment of the invention.
Figure 3:
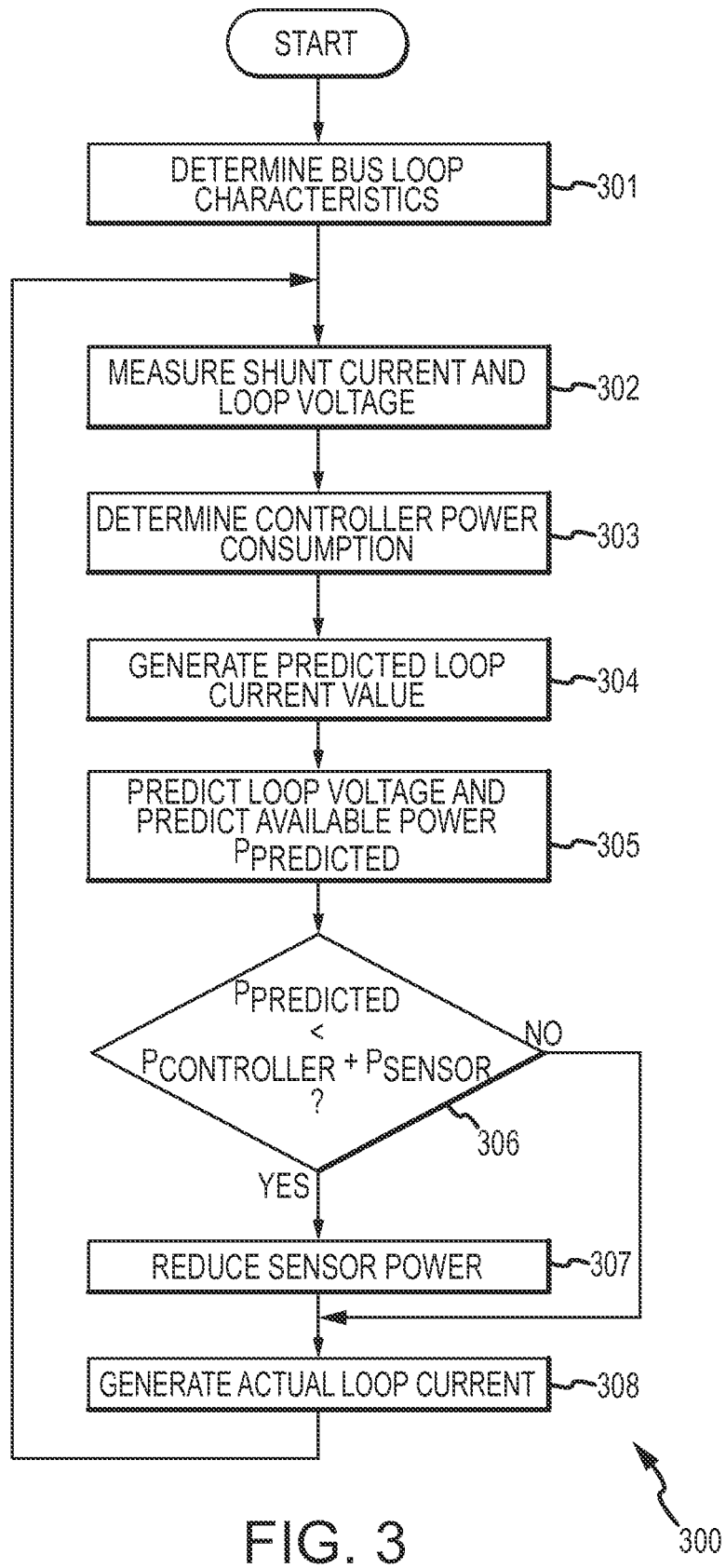
FIG. 3 is a flowchart of a method for predictively limiting power consumption in a bus instrument of a two-wire instrumentation bus according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a bus loop system 100 according to an embodiment of the invention. The bus loop system 100 includes a host system 1, a two-wire bus loop 4, and a bus instrument 10 connected to the two-wire bus loop 4. The host system 1 can include a power supply 2, a signaling resistor $R_S$, and a measuring device 3 coupled to the signaling resistor $R_S$. In some embodiments the bus loop system 100 can include an intrinsically safe (I.S.) barrier (see dashed line). The I.S. barrier can comprise a physical barrier that is designed to protect a hazardous environment, for example.

The host system 1 generates a loop voltage $V_L$ and a loop current $I_L$ over the two-wire bus loop 4. The loop voltage $V_L$ can be substantially defined or limited, such as by an intrinsic safety (I.S.) protocol or other hazardous or explosion-proof protocol. In some two-wire bus loop systems 100, the loop voltage $V_L$ is set between 16 and 36 volts (V). The loop voltage $V_L$ is dependent upon the power supply voltage $V_S$ and the loop current $I_L$. The loop current $I_L$ is set by the controller 20 but is constrained by an applicable bus or I.S. protocol. Consequently, the controller 20 can change the loop current $I_L$ in a limited manner. The loop current $I_L$ can be limited in such protocols to no more than 24 mA and typically ranges from 4 mA to 20 mA (or 10 mA to 20 mA) in order to communicate a measurement value to the host system 1. However, other loop current values are contemplated and are within the scope of the description and claims. Further, the loop voltage $V_L$ provided by the power supply 2 may not be fixed and may need to be measured in order to determine power. The loop voltage VL can deviate from the power supply voltage $V_S$.

The loop current $I_L$ flows through the signaling resistor $R_S$ and creates a variable voltage. The measuring device 3 measures the voltage created across the signaling resistor $R_S$ and converts the voltage into a measurement signal. Consequently, the loop current $I_L$ transfers a measurement from the sensor 13 and the controller 20 to the host system 1 and ultimately to an external device(s). In addition, a digital communication signaling can be superimposed on the loop current $I_L$ if desired.

The bus instrument 10 can comprise any manner of instrument. For purposes of illustration, the bus instrument 10 can comprise a flowmeter. Where the bus instrument 10 is a flowmeter, including a Coriolis flowmeter or vibratory densimeter, the sensor 13 includes a vibratory driver.

The bus instrument 10 includes a sensor 13, a controller 20, and a shunt regulator 14. Further, the bus instrument 10 can include a loop current controller 23 and voltage converters 24 and 25 for the sensor 13 and the controller 20. The sensor 13 in some embodiments can comprise a separate component (not shown) coupled to the bus instrument 10. The sensor 13 can comprise any manner of sensor, such as a flow meter, for example. However, other sensors are contemplated and are within the scope of the description and claims.

The controller 20 is coupled to and controls the sensor 13 and the loop current $I_L$. The controller 20 can operate the sensor 13 and can process signals received from the sensor 13 in order to transfer a measurement value as an analog output current that is in the form of a variable loop current $I_L$ flowing in the two-wire bus loop 4.

As can be seen from the figure, the loop current $I_L$ supplied to the bus instrument 10 comprises a controller current $I_{controller}$ flowing in the controller 20, a sensor current $I_{sensor}$ flowing in the sensor 13, and a shunt current $I_{shunt}$ flowing in the shunt regulator 14. It should be understood that the loop current $I_L$ is not fixed.

Because of the measurement communication protocol and the power limitations built into the bus loop system 100, the bus instrument 10 can be capable of consuming all electrical power supplied by the host system 1 (or can be capable of demanding more than the available power). Consequently, the bus instrument 10 may be the only instrument connected to the two-wire bus loop 4.

Because the loop current $I_L$ is limited, the bus instrument 10 can only consume the available electrical current. Therefore, if the measurement value generated by the bus instrument 10 corresponds to a loop current $I_L$ of 10 mA and the bus instrument requires only 8 mA to generate the measurement, then the bus instrument 10 must sink or consume the excess 2 mA in order to pull 10 mA from the host system 1. The shunt regulator 14 is configured to sink the excess 2 mA of electrical current.

The power supply 2 provides a total available power $P_{available}$ that comprises the loop voltage $V_L$ multiplied by the loop current $I_L$. The total available power $P_{available}$ further comprises the power consumed by the components of the bus instrument 10, i.e., $P_{available}=P_{shunt}+P_{sensor}+P_{controller}$. The controller power $P_{controller}$ is relatively fixed. Consequently, it may be desired to vary the sensor power $P_{sensor}$ in order to avoid exceeding the total available power $P_{available}$.

The bus instrument 10 is configured to predictively limit power consumption in use with a two-wire instrumentation bus. The bus instrument 10 is configured to generate a predicted available power $P_{predicted}$ that will be available to the bus instrument 10 after a change in the loop current $I_L$, compare the predicted available power $P_{predicted}$ to a present time power $P_{t0}$ comprising the controller power $P_{controller}$ plus the sensor power $P_{sensor}$, and reduce a sensor power $P_{sensor}$ in the sensor 13 if the predicted available power $P_{predicted}$ is less than the controller power $P_{controller}$ plus the sensor power $P_{sensor}$. In this manner, the power cannot exceed the limit before the power can be reduced.

Advantageously, the bus instrument and method according to the invention can predictively control power consumption in order to not exceed the applicable bus or I.S. protocol. Further, the bus instrument and method can perform power adjustments beforehand, preventing brown-outs, resets, erroneous measurement values, or other problems that may occur when the bus instrument runs out of available power. Moreover, the bus instrument and method can substantially maintain a spacing or buffer from the power limit, wherein unexpected power demand spikes are unlikely to exceed the power limit.

FIG. 2 shows the controller 20 according to an embodiment of the invention. The controller 20 can include an interface 201, a processing system 203, a current meter 250, and a voltage meter 252. The processing system 204 is coupled to the shunt regulator 14, the interface 201, the current meter 250, and the voltage meter 252. In some embodiments, the controller 20 is coupled to the sensor 13 via the interface 201.

The controller 20 receives sensor signals from the sensor 13 via the interface 201. The controller 20 processes the sensor signals in order to obtain data. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the controller 20 and external devices.

The shunt regulator 14 is configured to shunt excess electrical current. All electrical current not consumed by the controller 20 or the sensor 13 is consumed by the shunt regulator 14.

The current meter 250 is configured to measure electrical current and provide the measurement to the processing system 203. In some embodiments, the current meter 250 can measure the shunt current $I_{shunt}$. In some embodiments, the current meter 250 can measure the sensor current $I_{sensor}$.

The voltage meter 252 is configured measure the bus loop voltage $V_L$ and provide the measurement to the processing system 203. The loop voltage $V_L$ can comprise the voltage available at the bus instrument 10.

The processing system 203 conducts operations of the controller 20 and processes measurements received from the sensor 13. The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store parameters and data, software routines, constant values, and variable values. For example, the storage system 204 can store a processing routine 240, a controller power 241, a predicted available power $P_{predicted}$ 242, a measurement value 243, a loop voltage $V_L$ 244, a loop resistance $R_L$ 245, a supply voltage $V_S$ 246, a predicted loop current $I_{L\_next}$ 247, a loop current $I_L$ 248, and a sensor power $P_{sensor}$ 249.

The controller power 241 is the electrical power consumed by the controller 20. The controller power 241 can be determined as the predicted available power $P_{available}$ minus both the sensor power $P_{sensor}$ and the shunt power $P_{shunt}$. The controller power 241 may need to be only periodically determined, as the controller power $P_{controller}$ will change very little over time.

The predicted available power $P_{predicted}$ 242 is the power consumption that is predicted for a particular measurement value 243. The predicted available power $P_{predicted}$ 242 is used to determine if the measurement value 243 will cause the bus instrument 10 to exceed the controller power $P_{controller}$ 241 plus the sensor power $P_{sensor}$ 249. The determination can be used to reduce power consumption so that the predicted loop current $I_{L\_next}$ 247 does not lead to the power consumption exceeding the total available power.

The measurement value 243 comprises a measurement received from the sensor 13. The measurement value 243 in some embodiments is continuously updated as new measurement values are received.

The loop voltage $V_L$ 244 comprises a measurement or other determination of the voltage at the bus instrument 10. The loop voltage $V_L$ 244 may vary as the loop current $I_L$ 248 varies.

The loop resistance $R_L$ 245 comprises a measurement or other determination of the electrical resistance inherent in the two-wire bus loop 4 (see equation 1 below). The loop resistance $R_L$ 245 may be designed to be a standard value and will typically be substantially constant.

The supply voltage $V_S$ 246 comprises a determine voltage value. The supply voltage $V_S$ 246 can be determined according to equation 2 (see below).

The predicted loop current $I_{L\_next}$ 247 comprises a prediction of a future loop current based on a (new) measurement value 243. The predicted loop current $I_{L\_next}$ 247 may be the same, greater than, or less than the current loop current $I_L$ 248. Therefore, the predicted loop current $I_{L\_next}$ 247 is first checked to see if application of the predicted loop current $I_{L\_next}$ 247 (as the actual loop current $I_L$ 248) will exceed the total available power $P_{available}$ 241.

The loop current $I_L$ 248 is determined according to the measurement value 243, such as a flow rate measurement, for example. The measurement value 243 dictates the loop current $I_L$ 248 and therefore the loop current $I_L$ 248 is known.

The sensor power $P_{sensor}$ 249 comprises the power consumed by the sensor 13. The sensor power $P_{sensor}$ 249 comprises the sensor current $I_{sensor}$ multiplied by a known internally regulated voltage. The sensor current $I_{sensor}$ can be measured by the current meter 250.

In operation, the processing routine 240 is executed by the processing system 203. The processing routine 240 controls the bus instrument 10 in order to generate one or more measurements, such as one or more flow measurements, as previously discussed. In addition, the processing routine 240 can operate the bus instrument 10 in order to predictively limit power consumption. The processing routine 240 can implement various power-limiting algorithms, as discussed below.

FIG. 3 is a flowchart 300 of a method for predictively limiting power consumption in a bus instrument of a two-wire instrumentation bus according to an embodiment of the invention. This method substantially consumes the total available power at all times. In step 301, the supply voltage $V_S$ and the loop resistance $R_L$ are determined. This can be done before operation of the sensor, such as at a startup or reset, for example. The supply voltage $V_S$ and the loop resistance $R_L$ can be determined from loop voltage $V_L$ and loop current $I_L$ measurements obtained before operation and can subsequently be used in operation of the bus instrument.

The loop resistance $R_L$ is determined from characteristics of the bus loop system 100 in some embodiments. For example, the loop resistance $R_L$ can be determined from two sets of voltage and current measurements according to:

$$R_L = (V_{L1} - V_{L2})/(I_{L1} - I_{L2}) \tag{1}$$

The supply voltage $V_S$ can be determined from the measured loop voltage $V_L$, the determined loop resistance $R_L$, and the known loop current $I_L$. One set of the pre-operational loop measurements ($V_{L1}$, $I_{L1}$) or ($V_{L2}$, $I_{L2}$) may be used. The supply voltage $V_S$ can be determined according to:

$$V_S = V_L + (I_L * R_L) \tag{2}$$

In step 302, the shunt current $I_{shunt}$ and the loop voltage $V_L$ are measured during actual operation of the bus instrument. It should be understood that these two values can be measured on every measurement cycle or can be periodically measured, as they are not expected to radically change.

In step 303, the power consumed by the controller $P_{controller}$ is calculated. The total power available/consumed in the bus loop system $P_{available}$ comprises:

$$P_{available} = P_{shunt} + P_{controller} + P_{sensor} \quad (3)$$

The individual power amount can be determined from the loop voltage multiplied by the individual currents $I_{shunt}$, $I_{controller}$, and $I_{sensor}$.

Consequently, the controller power $P_{controller}$ comprises:

$$P_{controller} = P_{available} - P_{shunt} - P_{sensor} \quad (4)$$

The total available power $P_{available}$ is known and is substantially controlled/limited according to the method. The controller power $P_{controller}$ is substantially fixed. However, the sensor power $P_{sensor}$ in some embodiments can be adjusted and therefore can be used to ensure that the total available power $P_{available}$ does not exceed a bus or I.S. protocol.

In step 304, a next measurement value is received from the sensor and is used to generate a predicted loop current $I_{L\_next}$. However, the predicted loop current $I_{L\_next}$ is not implemented yet. Instead, the effect on power consumption is first assessed. In this manner, the method can avoid excessive power consumption by compensating for a future change in the loop current.

In step 305, a predicted loop voltage $V_{L\_next}$ and a predicted available power $P_{predicted}$ are generated. The predicted loop voltage $V_{L\_next}$ comprises a prediction of the voltage at the bus instrument according to the known power supply voltage $V_S$ and the predictive loop current $I_{L\_next}$. The predictive loop voltage $V_{L\_next}$ therefore comprises a prediction of the effect of the predictive loop current $I_{L\_next}$ on the loop voltage $V_L$. The predictive loop voltage $V_{L\_next}$ can be determined according to:

$$V_{L\_next} = V_S - (R_L)(I_{L\_next}) \quad (5)$$

The predicted available power $P_{predicted}$ comprises a prediction of the total power that will be provided to the bus instrument based on the predictive loop current $I_{L\_next}$. The predicted available power $P_{predicted}$ is determined according to:

$$P_{predicted} = (V_{L\_next})(I_{L\_next}) \quad (6)$$

In step 306, the predicted available power $P_{predicted}$ is compared to a current power consumption. Because the available power is always consumed in the bus instrument, the shunt current $I_{shunt}$ will exist only if the electrical current available to the bus instrument is greater than the current consumed by the sensor and controller. However, as the power usage becomes critical and the sensor power $P_{sensor}$ approaches the available power, the power consumed in the shunt regulator will be essentially zero, i.e., all power is consumed by the sensor and the controller, so that the power consumption at the present time $P_{t0}$ comprises $P_{t0} = P_{controller} + P_{sensor}$. Therefore, the predicted available power $P_{predicted}$ is compared to the controller power $P_{controller}$ and the sensor power $P_{sensor}$. If the predicted available power $P_{predicted}$ is less than the controller power $P_{controller}$ plus the sensor power $P_{sensor}$, then the predicted available power $P_{predicted}$ is insufficient and the sensor power $P_{sensor}$ will have to be reduced to avoid a power consumption fault.

In step 307, because the predicted available power $P_{predicted}$ would exceed the available power as represented by ($P_{controller} + P_{sensor}$), then the sensor power $P_{sensor}$ is reduced. In some embodiments, a buffer between the predicted available power $P_{predicted}$ and the available power is maintained through a SafetyFactor. In one embodiment, the predicted available power $P_{predicted}$ is used to accordingly reduce the sensor power $P_{sensor}$ and generate a reduced sensor power $P_{sensor\_reduced}$. For example, the reduced sensor power $P_{sensor\_reduced}$ can be generated according to:

$$P_{sensor\_reduced} = P_{predicted} - (P_{controller} + \text{SafetyFactor}) \quad (7)$$

The reduced sensor power $P_{sensor\_reduced}$ can achieve the overall power reduction. For example, the power reduction can include reducing a sensor current $I_{sensor}$. Alternatively, a voltage $V_{sensor}$ across the sensor can be reduced, or both.

In step 308, the new loop current $I_L$ (i.e., $I_{L\_next}$) is generated from the measurement value. Because the sensor power $P_{sensor}$ has already been changed to compensate for the measurement value, as needed, the change in the loop current $I_L$ should not impact operation of the bus instrument and should not exceed the power limitation in the two-wire bus loop 4. The method can then loop back to step 302, iteratively processing measurement values.

What is claimed is:

1. A bus instrument (10) configured to predictively limit power consumption and adapted for use with a two-wire instrumentation bus, the bus instrument (10) comprising;
   a sensor (13);
   a shunt regulator (14) configured for shunting excess electrical current; and
   a controller (20) coupled to the shunt regulator (14) and the sensor (13), with the controller (20) being configured to generate a predicted available power $P_{predicted}$ that will be available to the bus instrument (10) after a change in the loop current $I_L$, compare the predicted available power $P_{predicted}$ to a present time power $P_{t0}$ comprising a controller power $P_{controller}$ plus a sensor power $P_{sensor}$, and reduce the sensor power $P_{sensor}$ if the predicted available power $P_{predicted}$ is less than the controller power $P_{controller}$ plus the sensor power $P_{sensor}$.

2. The bus instrument (10) of claim 1, with the controller (20) being further configured to receive a measurement value from the sensor (13) and generate a predicted loop current $I_{L\_next}$ from the measurement value, wherein the predicted available power $P_{predicted}$ is generated using the predicted loop current $I_{L\_next}$.

3. The bus instrument (10) of claim 1, with reducing the sensor power $P_{sensor}$ including reducing a sensor current $I_{senser}$ provided to the sensor (13).

4. The bus instrument (10) of claim 1, with the controller (20) being further configured to determine a loop resistance $R_L$ and a supply voltage $V_S$.

5. The bus instrument (10) of claim 1, with the controller (20) being further configured to measure a first loop voltage $V_{L1}$ at a predetermined first loop current $I_{L1}$, measure a second loop voltage $V_{L2}$ at a predetermined second loop current $I_{L2}$, and determine the loop resistance $R_L$ from the first and second loop voltages $V_{L1}$ and $V_{L2}$ and the first and second loop currents $I_{L1}$ and $I_{L2}$.

6. A method for predictively limiting power consumption in a bus instrument of a two-wire instrumentation bus, the method comprising:
   generating a predicted available power $P_{predicted}$ that will be available to the bus instrument after a change in the loop current $I_L$;
   comparing the predicted available power $P_{predicted}$ to a present time power $P_{t0}$ comprising a controller power $P_{controller}$ plus a sensor power $P_{sensor}$; and
   reducing the sensor power $P_{sensor}$ if the predicted available power $P_{predicted}$ is less than the controller power $P_{controller}$ plus the sensor power $P_{sensor}$.

7. The method of claim 6, further comprising:

receiving a measurement value from the sensor;

generating a predicted loop current $I_{L\_next}$ from the measurement value, wherein the predicted available power $P_{predicted}$ is generated using the predicted loop current $I_{L\_next}$.

8. The method of claim 6, with reducing the sensor power $P_{sensor}$ including reducing a sensor current $I_{senser}$ provided to the sensor.

9. The method of claim 6, further comprising the preliminary step of determining a loop resistance $R_L$ and a supply voltage $V_S$.

10. The method of claim 9, with determining the loop resistance $R_L$ comprising the preliminary steps of:

measuring a first loop voltage $V_{L1}$ at a predetermined first loop current $I_{L1}$;

measuring a second loop voltage $V_{L2}$ at a predetermined second loop current $I_{L2}$; and determining the loop resistance $R_L$ from the first and second loop voltages $V_{L1}$ and $V_{L2}$ and the first and second loop currents $I_{L1}$ and $I_{L2}$.

* * * * *